July 26, 1960
F. G. BELLEK
2,946,838
ELECTRIC UTILITY BOX ASSEMBLY
Filed Sept. 21, 1959
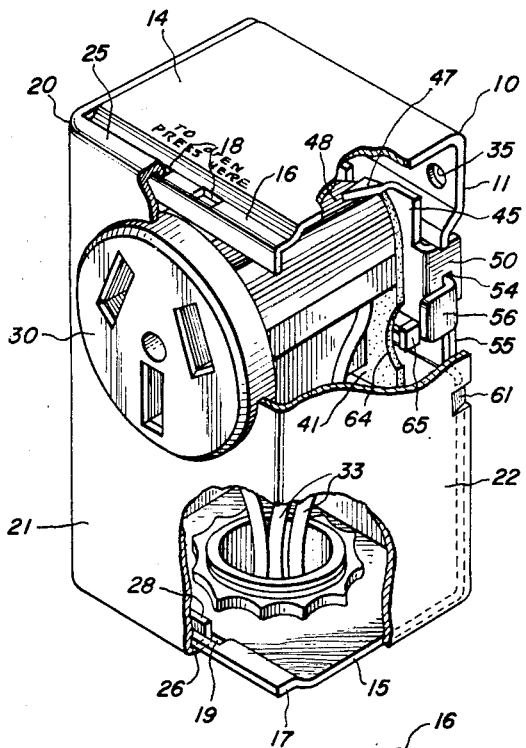
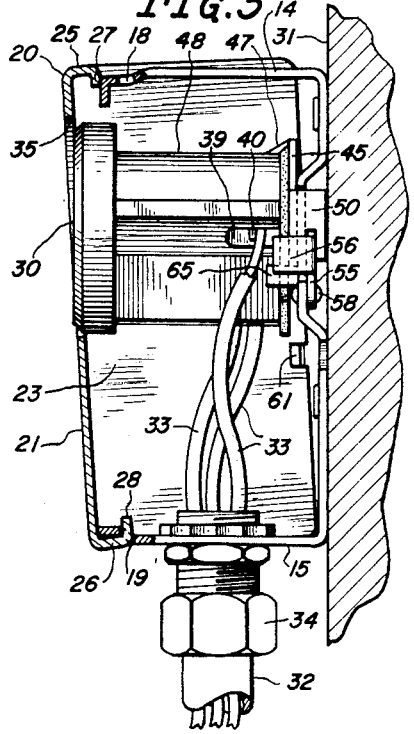
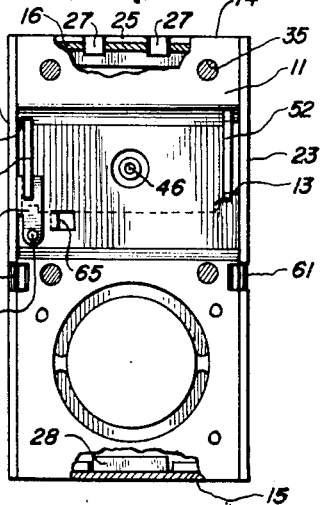
INVENTOR
Frank G. Bellek
BY
ATTORNEY

United States Patent Office 2,946,838
Patented July 26, 1960

2,946,838
ELECTRIC UTILITY BOX ASSEMBLY

Frank G. Bellek, Chicago, Ill., assignor to Bell Electric Company, Chicago, Ill., a corporation of Illinois Filed Sept. 21, 1959, Ser. No. 841,218

11 Claims. (Cl. 174—53)

The present invention relates to an electric utility box assembly. More particularly, it pertains to a box assembly of the kind attached to conduit and the like and which encloses electrical fixtures such as receptacles and switches.

Of prime significance in the selection of outlet boxes for use in wiring systems is the ease and facility with which such boxes and associated components may be installed and wired. Also of importance is the number of pieces involved in the assembly, both from a manufacturing and installation standpoint. Of course, the fewer the number of pieces involved the less the manufacturing cost, particularly where stamped parts are utilized. Also, it is highly advantageous to reduce the number of parts in order to decrease a chance of loss of a part either during packaging or during subsequent handling on the job. Both from a direct labor saving and a freedom from loss standpoint, it is advisable to reduce as much as possible the use of screws and other similar fastening devices usually required for such assemblies.

It is accordingly a general object of the present invention to provide a conduit box satisfying the foregoing requirements.

It is another object of the present invention to provide an electric utility box which is simple and inexpensive to manufacture and which on the job is easily and quickly assembled and installed.

A further object of the present invention is to provide an electric utility box of the foregoing character and which assures a safe, enduring mounting of the various parts and components.

A utility box constructed in accordance with the present invention includes a box base member having a rear wall with opposed recesses in its vertical margins. Associated therewith is a bracket plate upon which the wiring element device, such as a receptacle or switch, is carried and which has a pair of spaced ears rearwardly depending and seatable respectively in the marginal recesses. One of the ears has an enlarged end portion lockingly engageable behind the rear wall and the other ear has a notch disposed beyond the rear wall from the bracket plate. A latch lever is pivotally mounted on the rear wall with its free end movable into the notch. Cooperating therewith is a box cover member which includes a side wall and which is enclosingly mateable with the base member with a portion of the side wall disposed latchingly adjacent the lever in the notch.

The features of the invention which are believed to be novel are set forth with particularity in the appended claims. The organization and manner of operation of the invention, together with further objects and advantages thereof, may best be understood by reference to the following description taken in conjunction with the accompanying drawings, in which like reference numerals refer to like elements in several figures, and in which:

Fig. 1 is a perspective view, partially in cross section, of an assembled electric utility box constructed in accordance with the present invention;

Fig. 2 is a rearward perspective view of a portion of the box assembly of Fig. 1 and with certain of the parts in a different position;

Fig. 3 is a side elevational cross sectional view of the utility box assembly as shown in Fig. 1 but with the box assembly affixed to a wall; and Fig. 4 is a rear elevational view, partially in cross section, of the box assembly shown in Fig. 1.

The embodiment shown in Fig. 1 for purposes of illustrating the invention includes a box base member 10 having a rear wall 11 with opposed recesses 12 and 13 in the vertical margins thereof. Base 10 is generally U-shaped, having in addition to rear wall 11 top and bottom walls 14 and 15, respectively. The forward marginal edge portions 16 and 17 of top and bottom walls 14, 15, respectively, are off-set interiorly with edge portion 16 having slots 18 cut therein and edge portion 17 having a slot 19 cut therein.

Enclosingly mateable with base 10 is a box cover member 20 having a front wall 21 and side walls 22 and 23. Front wall 21 has inturned top and bottom marginal edge portions 25 and 26, respectively. Edge portions 25, 26 overlie off-set edge portions 16 and 17, respectively, thereby affording a smooth, finished appearance to the box assembly when cover 20 is mateably engaged with base 10.

Tongues 27 and 28 project interiorly from edge portions 25 and 26, respectively, in a position receivable within respective slots 18 and 19. Cover 20 is mounted upon base 10 by hooking tongue 28 in slot 19 and then depressing top wall 14 interiorly of the box to permit emplacement of cover 20 with tongue 27 engaged in slot 18.

In the instant embodiment, the illustrated box assembly serves to enclose and mount a convenience outlet 30 generally of a kind utilized to afford a service connection for electric ranges and the like. As is typical, base 10 is secured to a wall 31. A conduit 32, carrying leads 33, is coupled to base 10 by a conventional box connector 34.

To secure base 10 to wall 31, screws are inserted through suitable openings 35 in rear wall 11 and into the wall. Of course, front wall 21 has an opening 35 accommodating the face of receptacle 30 to expose the latter for mating engagement with a male plug (not shown).

Receptacle 30 includes wire clamping means exposedly mounted in the rear end thereof and in this instance including screws 38 mounted in recesses 39 carrying a conductive stop 40. The bared ends of leads 33 are inserted between stops 40 and screws 38 after which the latter are tightened down while receptacle 30 is held facing downward and outward away from base 10 which preferably, though not necessarily, already has been affixed upon wall 31. In order to insulatingly cover the exposed heads of screws 38, an insulating member 41 having openings 42 alignable with screws 38 is slidably mounted on the rear end of receptacle 30. After setting the clamping means by tightening screws 38, insulating member 41 is slid into place covering the screw heads. Thereupon, receptacle 30 is tilted backwardly toward its in-use position.

Receptacle 30 is carried upon a bracket plate 45. It is preferably secured thereto by a single fastener 46 and has forwardly depending fingers 47 lockingly engaged with the irregular side surface 48 of receptacle 30. Bracket plate 48 has a pair of spaced ears 49 and 50 rearwardly depending therefrom and seatable respectively in opposed recesses 13 and 12. Ear 49 has an enlarged end portion 52 lockingly engageable behind rear wall 11; that is, end portion 52 defines a hook engageable with the back side of rear wall 11.

Rearwardly depending ear 50 has a notch 54 disposed to lie beyond rear wall 11 and recess 12 from bracket plate 45. Cooperating with notch 54 is a latch lever 55 movable between a position laterally away from rear wall 11 (as shown in Fig. 2) to a position in notch 54. Latch lever 55 includes a forwardly depending tab 56. As shown tab 56 overlies a portion of rearwardly depending ear 50. Tab 56 defines a stop limiting movement of the free end of lever 55 to its position within notch 54. Lever 55 is in this instance pivotally mounted on rear wall 11 by a rivet 58.

To complete the installation after quickly connecting leads 33 to receptacle 30 by clamping means 38, receptacle 30 is tilted rearwardly to lock ear 49 in recess 13 with end portion 52 behind rear wall 11. Receptacle 30 is then moved to swing ear 50 into recess 12 after which latch lever 55 is swung into notch 54. With this simple movement, receptacle 30 is affixed in position. Thereupon, cover 20 is brought into position with tongue 28 disposed in slot 19. Top wall 14 is depressed slightly to permit seating of cover 20, whereupon tongue 27 is seated in slot 18. At the same time, a portion of side wall 22 is moved into position latchingly adjacent lever 55 positioned in notch 54, locking lever 55 in place and thereby securely affixing receptacle 30 in its use position.

Smooth mating engagement of cover 20 upon base 10 is enhanced by positioning rivet or pin 58 inwardly of the adjacent marginal edge of rear wall 11 and punching a slight cut-out 60 immediately below recess 12 to accommodate the lower portion of tab 56 so that the latter lies easily within side wall 22 which overlies tab 56. To insure proper mating engagement of cover 20 with base 10, a lug 61 preferably is struck slightly inward from the rear marginal edge portion of each side walls 22 and 23. Lugs 61 are matingly received in notches 62 punched into the vertical marginal edges of rear wall 11.

For the purpose of insuring electrical safety, a recess 64 is cut into one marginal edge of insulating member 41 and a lug 65 is struck forwardly from rear wall 11. Lug 65 is positioned to be received in recess 64 only when insulating member 41 has been slid into covering relationship over screws 38; otherwise, lug 65 strikes insulating member 41 and prevents mounting of bracket 45 upon rear wall 11.

Observably, the constructional arrangements embodying the concepts of the present invention permit ready, quick installation of convenience outlets and the like. The assembly need include no loose, small parts which are easily lost in packaging and unpackaging; screws 38 may, as is conventional, have their ends peened in place since they do not need to be removed. The box assembly itself and receptacle 30 are mounted and assembled with but three separable parts involved. All three of the major structural components may be manufactured with simple stamping operations. Yet, a very safe and certain assembly is obtained.

While a particular embodiment of the present invention has been shown and described, it is apparent that changes and modifications may be made without departing from the invention's broader aspects. The aim of the appended claims therefore is to cover all such changes and modifications as fall within the true spirit and scope of the invention.

What is claimed is:

1. An electric utility box comprising: a generally U-shaped box base having top, bottom and rear walls with opposed recesses in vertical margins of said rear wall; a bracket plate upon which a wiring element device is carried and having a pair of spaced ears rearwardly depending and seatable respectively in said recesses with one of said ears having an enlarged end portion lockingly engaged behind said rear wall and the other of said ears having a notch disposed beyond said rear wall from said plate; a latch lever pivotally mounted on said rear wall with its free end movable into said notch and having a tab depending over a portion of said other ear with said lever end in said notch; and a generally T-shaped box cover having front and side walls enclosingly mateable with said base with a portion of one of said side walls overlying said tab.

2. An electric utility box comprising: a box base member including a rear wall with opposed recesses in the vertical margins thereof; a bracket plate upon which a wiring element device is carried and having a pair of spaced ears rearwardly depending and seatable respectively in said recesses with one of said ears having an enlarged end portion lockingly engaged behind said rear wall and the other of said ears having a notch disposed beyond said rear wall from said plate; a latch lever pivotally mounted on said rear wall with its free end movable into said notch and having a tab depending over a portion of said other ear with said lever end in said notch; and a box cover member including a side wall and enclosingly mateable with said base member with a portion of said side wall overlying said tab.

3. An electric utility box comprising: a box base member including a rear wall having a portion off-set forwardly and with opposed recesses in the vertical margins of said portion; a bracket plate upon which a wiring element device is carried and having a pair of spaced ears rearwardly depending and seatable respectively in said recesses with one of said ears having an enlarged end portion lockingly engaged behind said rear wall and the other of said ears having a notch disposed beyond said rear wall from said plate; a latch lever pivotally mounted on said rear wall with its free end movable into said notch and a box cover member including a side wall and enclosingly mateable with said box member with a portion of said side wall latchingly adjacent said lever in said notch.

4. An electric utility box comprising: a box base member including a rear wall with opposed recesses in the vertical margins thereof; a wiring element device having wire clamping means exposedly mounted in the rear wall thereof; a bracket plate having openings aligned with said clamping means and affixed across said rear end and having a pair of spaced ears rearwardly depending and seatable respectively in said recesses with one of said ears having an enlarged end portion lockingly engaged behind said rear wall and the other of said ears having a notch disposed beyond said rear wall from said plate; a latch lever pivotally mounted on said rear wall with its free end movable into said notch; and a box cover member including a side wall and enclosingly mateable with said base member with a portion of said side wall latchingly adjacent said lever in said notch.

5. An electric utility box comprising: a box base member including a rear wall with opposed recesses in the vertical margins thereof; a wiring element device having an irregular side surface terminating in a rear end surface; a bracket plate, affixed across said rear end surface by a single fastener, having forwardly projecting fingers lockingly engaged with said side surface and having a pair of spaced ears rearwardly depending and seatable respectively in said recesses with one of said ears having an enlarged end portion lockingly engaged behind said rear wall and the other of said ears having a notch disposed beyond said rear wall from said plate; a latch lever pivotally mounted on said rear wall with its free end movable into said notch; and a box cover member including a side wall and enclosingly mateable with said base member with a portion of said side wall latchingly adjacent said lever in said notch.

6. An electric utility box comprising: a box base member including a rear wall with opposed recesses in the vertical margins thereof; a bracket plate upon which a wiring element device is carried and having a pair of spaced ears rearwardly depending and seatable respectively in said recesses with one of said ears having a notch disposed beyond said rear wall from said plate; means on the free end of the other of said ears defining a hook engageable with the back side of said rear wall away from said plate; a latch lever pivotally mounted on said rear wall with its free end movable into said notch; and a box cover member including a side wall and enclosingly mateable with said base member with a portion of said side wall latchingly adjacent said lever in said notch.

7. An electric utility box comprising: a box base member including a rear wall with opposed recesses in the vertical margins thereof; a bracket plate upon which a wiring element device is carried and having a pair of spaced ears rearwardly depending and seatable respectively in said recesses with one of said ears having an enlarged end portion lockingly engaged behind said rear wall and the other of said ears having a notch disposed beyond said rear wall from said plate; a latch lever pivotally mounted on said rear wall with its free end movable into said notch; and a box cover member including a side wall and enclosingly mateable with said base member with a portion of said side wall latchingly adjacent said lever in said notch.

8. An electric utility box comprising: a box base member including a rear wall with opposed recesses in the vertical margins thereof; a bracket plate upon which a wiring element device is carried and having a pair of spaced ears rearwardly depending and seatable respectively in said recesses with one of said ears having an enlarged end portion lockingly engaged behind said rear wall and the other of said ears having a notch disposed beyond said rear wall from said plate; a latch lever pivotally mounted on said rear wall with its free end movable between a position laterally away from said notch and a position in said notch; means defining a stop limiting movement of said free end towards said notch to said position in said notch; and a box cover member including a side wall and enclosingly mateable with said base member with a portion of said side wall latchingly adjacent said lever in said notch.

9. An electric utility box comprising: a box base member including a rear wall with opposed recesses in the vertical margins thereof; a bracket plate upon which a wiring element device is carried and having a pair of spaced ears rearwardly depending and seatable respectively in said recesses with one of said ears having an enlarged end portion lockingly engaged behind said rear wall and the other of said ears having a notch disposed beyond said rear wall from said plate; a latch lever pivotally mounted on said rear wall with its free end movable into said notch and having a tab depending forwardly over the adjacent one of said vertical margins; and a conduit box cover member including a side wall and enclosingly mateable with said base member with a portion of said side wall overlying said tab.

10. An electric utility box comprising: a box base member including a rear wall with opposed recesses in the vertical margins thereof; a wiring element device having wire clamping means exposedly mounted in the rear end thereof; an insulating member, having openings alignable with said clamping means, slidably mounted on said rear end over said clamping means and slidable between first and second positions respectively exposing and covering said clamping means with said member having a recess; a bracket plate affixed on said device and having a pair of spaced ears rearwardly depending and seatable respectively in said opposed recesses with one of said ears having an enlarged end portion lockingly engaged behind said rear wall and the other of said ears having a notch disposed beyond said rear wall from said plate; a lug projecting forwardly from said rear wall in a position accommodating said recess in said insulating member only when the latter is in said second position; a latch lever pivotally mounted on said rear wall with its free end movable into said notch; and a box cover member including a side wall and enclosingly mateable with said base member with a portion of said side wall latchingly adjacent said lever in said notch.

11. An electric utility box comprising: a generally U-shaped box base having top, bottom and rear walls with opposed recesses in the vertical margins of said rear wall and with the forward marginal edge portions of said top and bottom walls off-set interiorly, each edge portion having a slot; a bracket plate upon which a wiring element device is carried and having a pair of spaced ears rearwardly depending and seatable respectively in said recesses with one of said ears having an enlarged end portion lockingly engaged behind said rear wall and the other of said ears having a notch disposed beyond said rear wall from said plate; a latch lever pivotally mounted on said rear wall with its free end movable into said notch; and a generally U-shaped box cover having front and side walls enclosingly mateable with said base with a portion of one of said side walls latchingly adjacent said lever in said notch, said front wall having inturned top and bottom marginal edge portions overlying said off-set top-and-bottom-wall edge portions and having interiorly projecting tongues engageable in said slots.

No references cited.